United States Patent
Green et al.

(10) Patent No.: US 11,620,808 B2
(45) Date of Patent: Apr. 4, 2023

(54) METHOD FOR DETECTING HUMAN OCCUPANCY AND ACTIVITY IN A WORK AREA

(71) Applicant: VergeSense, Inc., Mountain View, CA (US)

(72) Inventors: Kelby Green, Mountain View, CA (US); Dan Ryan, Mountain View, CA (US); Tung Hoang, Mountain View, CA (US)

(73) Assignee: VergeSense, Inc., Mountain View, CA (US)

( * ) Notice: Subject to any disclaimer, the term of this patent is extended or adjusted under 35 U.S.C. 154(b) by 198 days.

(21) Appl. No.: 17/033,462

(22) Filed: Sep. 25, 2020

(65) Prior Publication Data

US 2021/0110193 A1    Apr. 15, 2021

Related U.S. Application Data

(60) Provisional application No. 62/906,022, filed on Sep. 25, 2019.

(51) Int. Cl.
*G06V 10/44* (2022.01)
*G06K 9/62* (2022.01)
(Continued)

(52) U.S. Cl.
CPC .......... *G06V 10/44* (2022.01); *G06K 9/6269* (2013.01); *G06V 10/255* (2022.01); *G06V 10/50* (2022.01); *G06V 10/60* (2022.01)

(58) Field of Classification Search
CPC ........ G06V 10/44; G06V 10/60; G06V 10/50; G06V 10/255; G06K 9/6269
See application file for complete search history.

(56) References Cited

U.S. PATENT DOCUMENTS 6,535,793 B2    3/2003  Allard
6,580,424 B1    6/2003  Krumm
(Continued)

FOREIGN PATENT DOCUMENTS

WO    2017072158 A1    5/2017

OTHER PUBLICATIONS

International Search Report received in PCT/US2020/023025 dated Jun. 17, 2020.
(Continued)

*Primary Examiner* — Pinalben Patel
(74) *Attorney, Agent, or Firm* — Run8 Patent Group, LLC; Peter Miller

(57) ABSTRACT

A method includes: recording an image at a sensor block, the sensor block; detecting a set of objects in the image based on an object classification model; generating a feature vector for the image based on the set of objects; accessing a workstation template for the work area, the workstation template defining a set of default objects for each workstation in the work area; identifying a subset of objects comprising an intersection of the set of default objects and the set of objects; removing the subset of objects from the feature vector; accessing an occupancy template for the work area, the occupancy template defining a set of significant objects; classifying the workstation as occupied based on the feature vector and the set of significant objects; and rendering a representation of the workstation at a work area interface, the representation indicating occupancy of the workstation.

17 Claims, 4 Drawing Sheets

(51) Int. Cl.
*G06V 10/50* (2022.01)
*G06V 10/60* (2022.01)
*G06V 10/20* (2022.01)

(56) References Cited

U.S. PATENT DOCUMENTS

| | | |
|---|---|---|
| 8,878,773 B1 | 11/2014 | Bozarth |
| 9,786,097 B2 | 10/2017 | Bell et al. |
| 9,836,885 B1 | 12/2017 | Eraker et al. |
| 9,978,260 B2 | 5/2018 | Lee et al. |
| 10,397,495 B1 | 8/2019 | Graber et al. |
| 10,594,987 B1 | 3/2020 | Nixon et al. |
| 10,659,737 B2 | 5/2020 | Ryan et al. |
| 2004/0156530 A1 | 8/2004 | Brodsky et al. |
| 2007/0070069 A1 | 3/2007 | Samarasekera et al. |
| 2007/0279214 A1 | 12/2007 | Buehler |
| 2008/0007720 A1 | 1/2008 | Mittal |
| 2008/0008360 A1 | 1/2008 | Pattikonda |
| 2009/0153655 A1 | 6/2009 | Ike et al. |
| 2009/0216501 A1 | 8/2009 | Yeow et al. |
| 2010/0066559 A1 | 3/2010 | Judelson |
| 2010/0092036 A1* | 4/2010 | Das .............. G06V 10/50 382/165 |
| 2010/0141515 A1 | 6/2010 | Doucet et al. |
| 2010/0316257 A1 | 12/2010 | Xu et al. |
| 2011/0157396 A1 | 6/2011 | Kotani |
| 2012/0153868 A1 | 6/2012 | Gu et al. |
| 2012/0185094 A1 | 7/2012 | Rosenstein et al. |
| 2012/0307113 A1 | 12/2012 | Peles et al. |
| 2013/0222599 A1 | 8/2013 | Shaw et al. |
| 2014/0093130 A1 | 4/2014 | Dasu et al. |
| 2014/0118339 A1 | 5/2014 | Davies et al. |
| 2014/0210856 A1 | 7/2014 | Finn et al. |
| 2015/0025842 A1 | 1/2015 | Hodge |
| 2016/0037082 A1 | 2/2016 | Wang et al. |
| 2016/0188977 A1 | 6/2016 | Kearns et al. |
| 2016/0239976 A1 | 8/2016 | Fathi et al. |
| 2017/0061763 A1 | 3/2017 | Hanson et al. |
| 2017/0076571 A1 | 3/2017 | Borel et al. |
| 2017/0220037 A1 | 8/2017 | Berestov et al. |
| 2017/0286761 A1 | 10/2017 | Zackay et al. |
| 2017/0301104 A1 | 10/2017 | Qian et al. |
| 2018/0001481 A1 | 1/2018 | Shah et al. |
| 2018/0082414 A1* | 3/2018 | Rozenberg .............. G06T 7/001 |
| 2018/0137369 A1* | 5/2018 | Roth .................. G06V 40/10 |
| 2018/0233010 A1 | 8/2018 | Modestine et al. |
| 2018/0295327 A1 | 10/2018 | Yearwood |
| 2018/0308329 A1* | 10/2018 | Lo ....................... G08B 21/22 |
| 2018/0321645 A1 | 11/2018 | Caicedo Fernandez et al. |
| 2018/0324393 A1 | 11/2018 | Ryan et al. |
| 2019/0043259 A1 | 2/2019 | Wang et al. |
| 2019/0052820 A1 | 2/2019 | Berner |
| 2019/0089910 A1 | 3/2019 | Banik et al. |
| 2019/0156496 A1 | 5/2019 | Leduc |
| 2019/0221003 A1 | 7/2019 | Zhou et al. |
| 2019/0258851 A1* | 8/2019 | Rajan ...................... G06T 7/20 |
| 2019/0304089 A1 | 10/2019 | Moore et al. |
| 2020/0302188 A1 | 9/2020 | Iwai |

OTHER PUBLICATIONS

Ip.com search report.

Khan et al., "Consistent Labeling of Tracked Objects in Multiple Cameras with Overlapping Fields of View", IEEE Transactions on Pattern Analysis and Machine Intelligence, vol. 25, No. 10, Oct. 2003.

Lighsearch. Occupancy and Vacancy Sensors Lightsearch; Article [online] 2017 (retrieved 18 May "Occupancy 2020]. and Retrieved Vacancy from the Sensors" Internet: Lightsearch;; p. 4, paragraph 3 US 2012/0153868 A1 (Gu, X. et al.) Jun. 21, 2012; paragraph [0095].

Mittal, Generalized Multi-Sensor Planning, Dept. Computer Science and Engg, IIT Madras.

NASA "Graphical User interface Development and Design to Support Airport Runway Configuration Management" NASA; Retrieved from the Internet:; table 8; p. 4, paragraph 1; p. 5, paragraphs 1-3.

Office Action received in U.S. Appl. No. 16/191,115 dated Dec. 11, 2019.

Office Action received in U.S. Appl. No. 16/191,115 dated Jul. 23, 2020.

Office Action received in U.S. Appl. No. 16/820,603 dated May 28, 2020.

Tesfaye et al., "Multi-Target Tracking in Multiple Non-Overlapping Cameras using Constrained Dominant Sets", Computer Vision and Pattern Recognition, 2017.

* cited by examiner

METHOD FOR DETECTING HUMAN OCCUPANCY AND ACTIVITY IN A WORK AREA

CROSS-REFERENCE TO RELATED APPLICATIONS

This application claims the benefit of U.S. Provisional Application No. 62/906,022, filed on 25 Sep. 2019, which is incorporated in its entirety by this reference.

This application is related to U.S. patent application Ser. No. 15/973,445, filed on 7 May 2018, which is incorporated in its entirety by this reference.

TECHNICAL FIELD

This invention relates generally to the field of workplace monitoring and more specifically to a new and useful method for detecting human occupancy and activity in a work area in the field of workplace monitoring.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
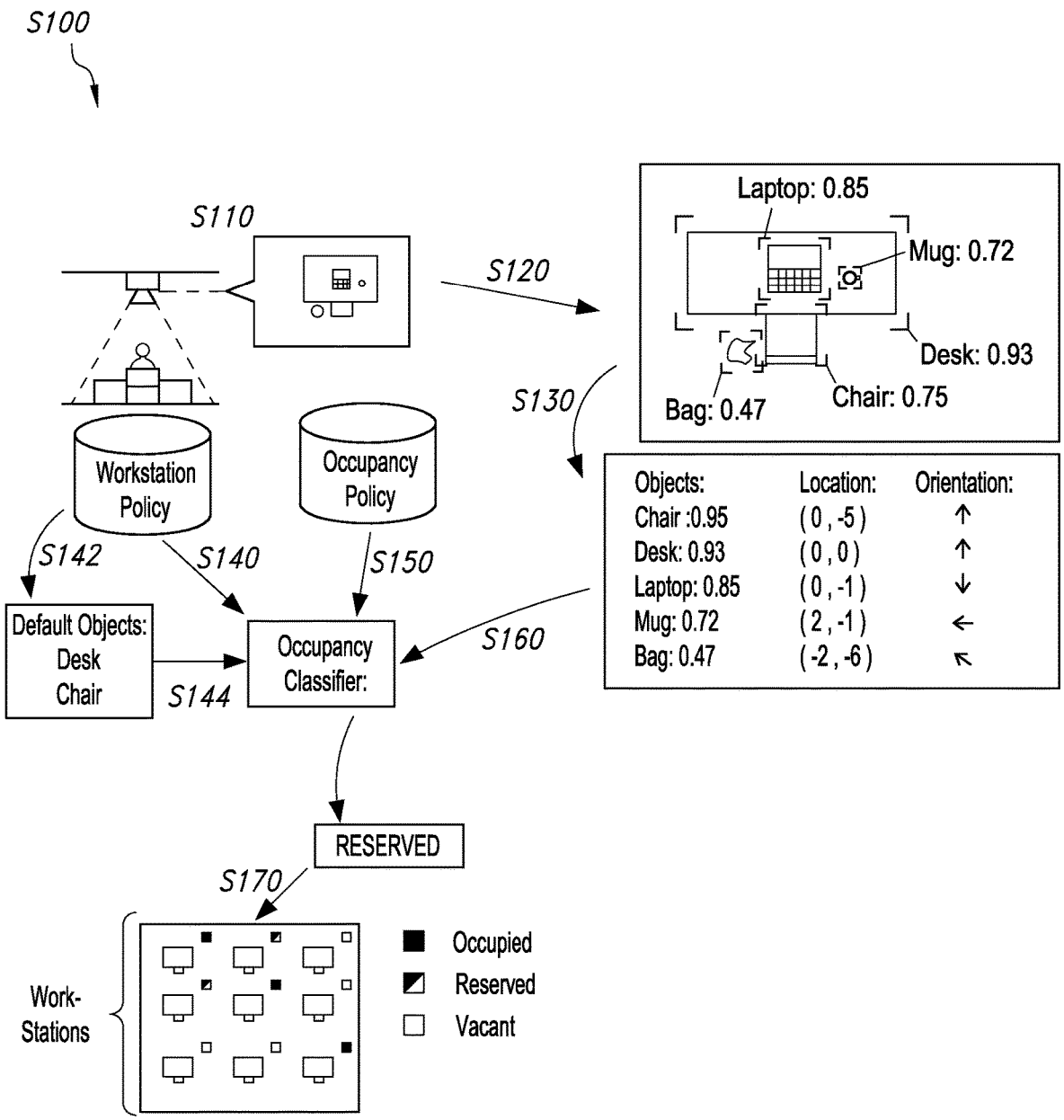
FIG. 1 is a flowchart representation of a method.

As shown in FIG. 1, a method S100 includes: recording a first image at a sensor block at a first time, the sensor block defining a field of view intersecting a work area and encompassing a workstation in the work area in Block S110; detecting a set of objects in the first image based on an object classification model in Block S120; generating a feature vector for the first image based on the set of objects, the feature vector comprising a confidence value and a location of each object in the set of objects in Block S130; accessing a workstation template for the work area, the workstation template defining a set of default objects for each workstation in the work area in Block S140; identifying a subset of objects comprising an intersection of the set of default objects and the set of objects in Block S142; removing the subset of objects from the feature vector in Block S144; accessing an occupancy template for the work area, the occupancy template defining a set of significant objects in Block S150; classifying the workstation as occupied based on the feature vector and the set of significant objects in Block S160; and rendering a representation of the workstation at a work area interface, the representation indicating occupancy of the workstation in Block S170.

Figure 2:
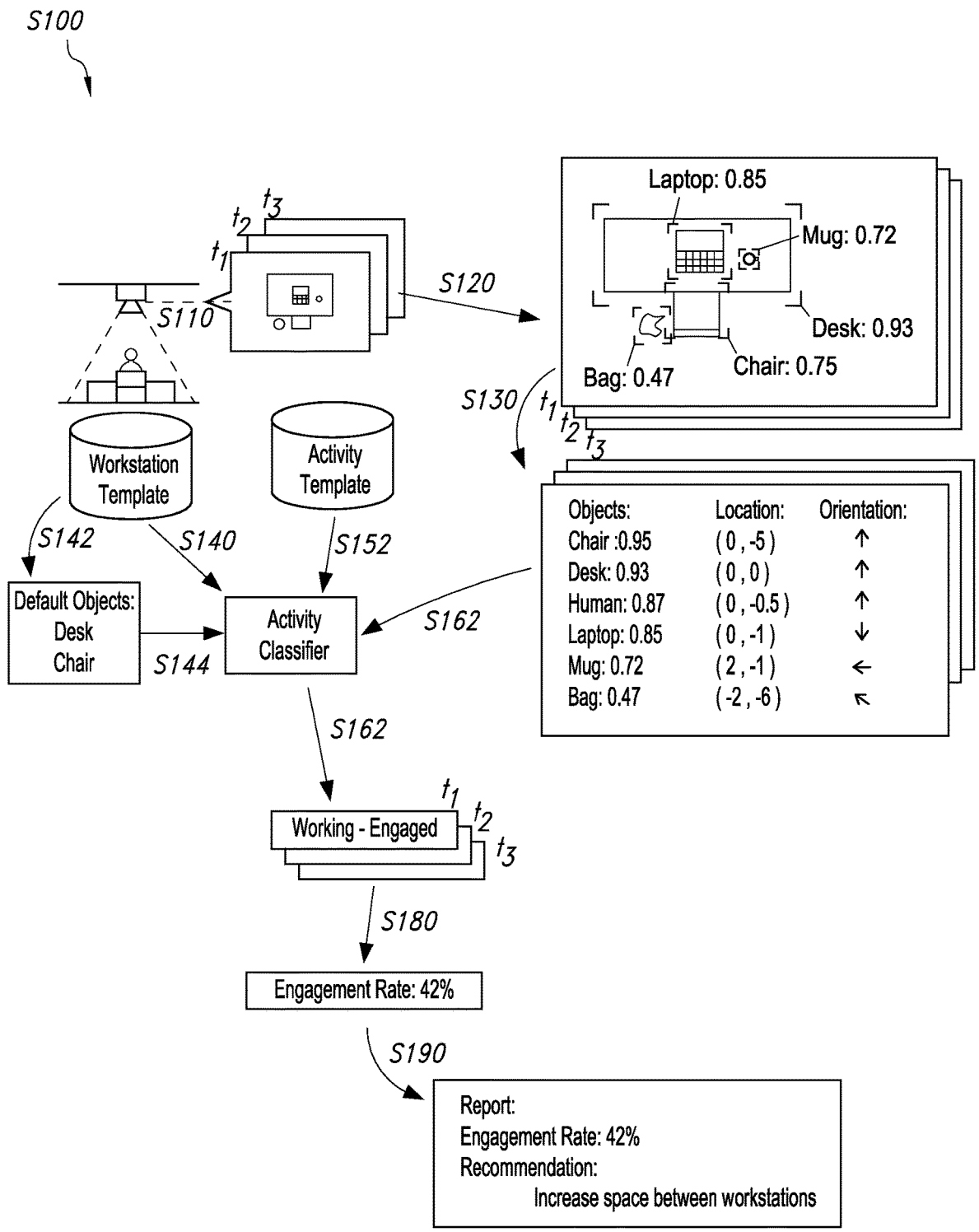
FIG. 2 is a flowchart representation of one variation of the method.

As shown in FIG. 2, one variation of the method S100 includes, periodically, during a first time period: recording an image at a sensor block, the sensor block defining a field of view intersecting a work area and encompassing a workstation in the work area in Block S110; detecting a set of objects in the image based on an object classification model in Block S120; generating a feature vector for the image based on the set of objects, the feature vector comprising a classification and a location of each object in the set of objects in Block S130; accessing a workstation template for the work area, the workstation template defining a set of default objects in the work area in Block S140; identifying a subset of objects comprising an intersection of the set of default objects and the set of objects in Block S142; removing the subset of objects from the feature vector in Block S144; accessing an activity template for the work area, the activity template defining a set of significant objects in Block S152; classifying human activity at the workstation based on the feature vector and the set of significant objects to generate an activity classification in Block S162; and aggregating the activity classification into a set of activity classifications for the workstation in Block S180. This variation of the method S100 also includes generating a use of space recommendation based on the set of activity classifications in Block S190.

Another variation of the method S100 includes: recording a first image at a sensor block at a first time, the sensor block defining a field of view intersecting a work area and encompassing a workstation in the work area in Block S110; detecting a set of objects in the first image based on an object classification model in Block S120; generating a feature vector for the first image based on the set of objects, the feature vector comprising a classification and a location of each object in the set of objects in Block S130; accessing a workstation template for the work area, the workstation template defining a set of default objects in the work area in Block S140; identifying a subset of objects comprising an intersection of the set of default objects and the set of objects in Block S142; removing the subset of objects from the feature vector in Block S144; accessing an activity template for the work area, the activity template defining a set of significant objects in Block S152; classifying human activity at the workstation based on the feature vector and the set of significant objects to generate an activity classification in Block S162; and generating a use of space recommendation based on the activity classification in Block S190.

2. Applications

Figure 4:
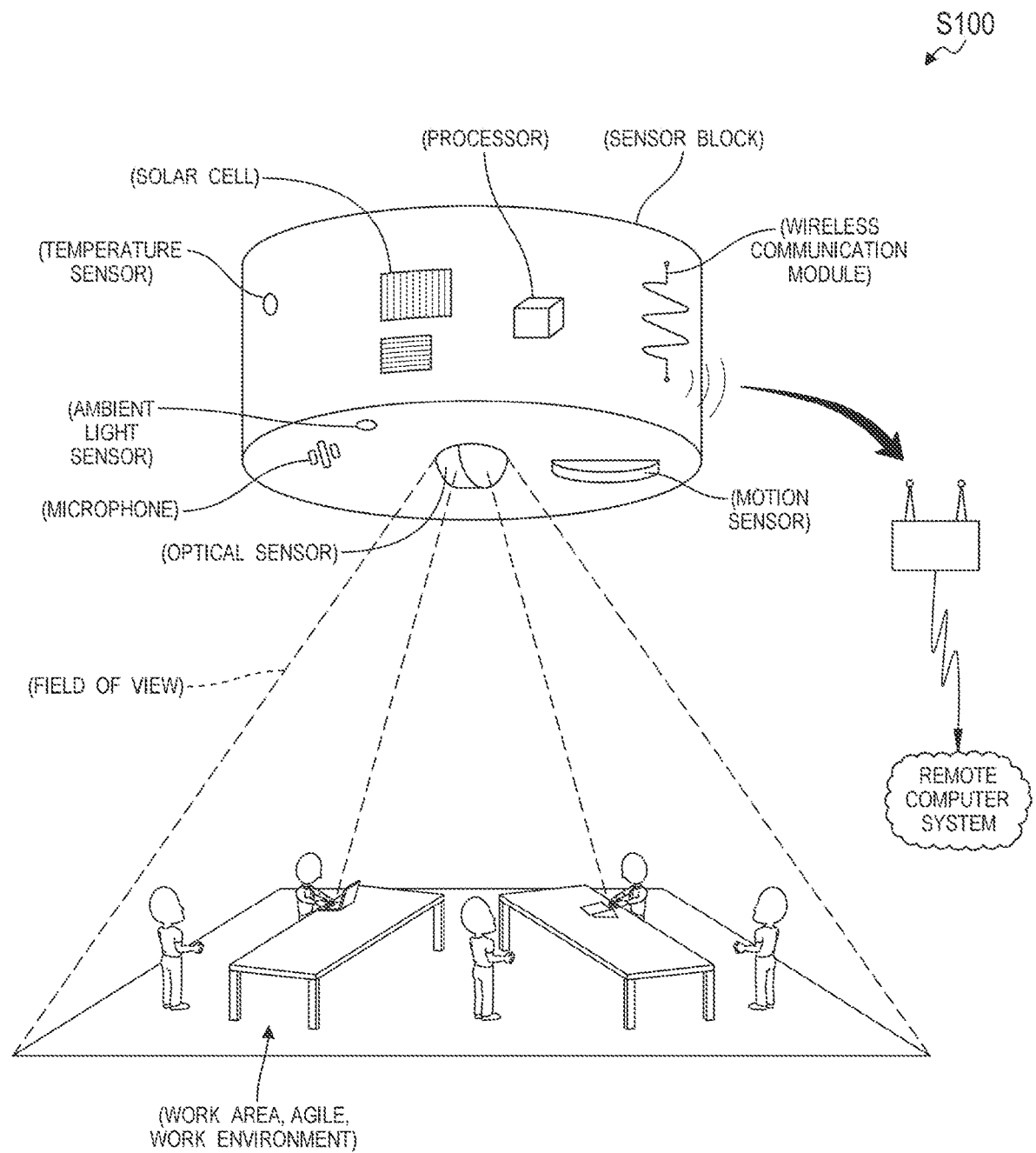
FIG. 4 is a schematic representation of a system.

Generally, the method S100 can be executed within a work area—such as within a conference room, an agile work environment, a cafeteria, or a lounge, etc. within a facility—to monitor changes in human occupancy in the work area, to update schedulers or resource managers regarding the occupancy status of various workstations within the work area and the activities performed by human occupants of these workstations, and to control various actuators throughout the work area based on these changes in human occupancy. As shown in FIG. 4, Blocks of the method S100 can be executed by a system including: a set of sensor blocks deployed throughout the facility; a remote computer system that updates schedulers, serves prompts for managers or administrators based on occupancy changes and states of spaces within the work area; and local gateways arranged throughout the facility that are configured to pass data between these sensor blocks and the remote computer system.

In particular, each sensor block can include an optical sensor (e.g., a camera; and various other sensors) and can be configured to mount to a wall, ceiling, or other surface within the field of view of the optical sensor facing an area of interest within the facility. For example, a sensor block can be arranged overhead and facing downward over a conference table in a conference room or arranged overhead and facing downward over a cluster of desks in a work area within the facility.

In order to accurately detect the occupancy status of a workstation in a work area immediately upon deployment in a new work area, the system can: record images of the workstation; extract features from these images; and classify the occupancy of the workstation (as occupied, vacant, or reserved) and/or the activity of humans occupying the workstation based on the extracted set of features. However, due to the diverse nature of work areas across companies, facilities, industries, etc. an image classification model can fail to accurately detect the occupancy status of a workstation. For example, at a first work area, each workstation may be equipped with a keyboard, mouse, monitor, and wooden desk while, at a second work area, each workstation may include a metal desk occupied solely by a charging station for a laptop computer. In this example, a general image-based classification model may require a large number of diverse training examples and/or significant training time at both the first work area and the second work area to identify optical features that signal occupancy or vacancy in both work areas. Additionally, such an image classification model may also require high per-inference runtime and power requirements, which may compromise performance in an edge computing environment. However, the method S100 can eliminate sources of overfitting that may confound image-based classification models in order to improve initial classification of human occupancy and activity in new work areas without requiring additional training examples.

The system executes an object detection model to extract a set of features representing objects detected in each image captured by a sensor block. Each feature in the set of features includes an object classification describing the type of object depicted in the image and a location (i.e., a pixel location) of the object within the image. The system can include an object detection model that is configured to detect workplace specific objects such as laptop computers, desktop computers, monitors, keyboards, coffee cups, coats, backpacks, or any other object that may be common in a work area. Upon receiving an input image, the system can execute the object detection model to output a feature vector of a set of detected objects including the classification of each object (and associated confidence values) in addition to a location, an orientation, and/or a bounding region representing the object within the image.

The system can then access a workstation template for the work area (e.g., defined by an administrator of the work area) to identify specific object types that are supplied by default at each workstation (i.e., a set of default objects). Additionally, the system can access an occupancy template (e.g., defined by an administrator for the work area) that defines objects and/or combinations of objects that, when present at a workstation, indicate occupancy of the workstation. For example, an administrator of a first work area may dictate that a workstation is classified as occupied while a worker's laptop is present at the workstation; and another administrator of a second work area may dictate that a workstation is classified as occupied exclusively when a human is present at the workstation. Likewise, the system can access activity templates that define objects and/or combinations of objects that, when present at a workstation, indicate particular human activities, such as working or presenting (e.g., in a conference room).

Thus, the system can take in the workstation template of a new work area and "mute" specific objects in the feature vector that persist (e.g., are always present) in the work area. Likewise, the system can take in an occupancy template and boost the importance of those particular objects when they are detected in an image of a workstation. Therefore, the system can provide an accurate classification as to whether a workstation in the new work area is occupied, based on an overhead image of the workstation, while bypassing the typical process of retraining an image-based classification model based on a new set of images taken from the new work area.

Once the system applies the workstation template and/or the occupancy template to the feature vector generated by the object classification model, the system can execute an occupancy classification model in order to classify the workstation in the image as vacant, occupied, or reserved. The occupancy classification model receives an input feature vector and classifies the workstation in the image as occupied or vacant based on the classification, location, and orientation of objects in the image. The occupancy classification model differs from an image-based classification model as it does not consider optical features of the image directly and instead classifies the occupancy of the workstation based on detected objects in the scene. Due to the reduction in feature "noise" when compared to image-based classification models, the system executing the occupancy classification model can more robustly classify the occupancy of workstations in a new work area (i.e. a work area that was not a source for training images of the object classification model and/or the occupancy classifier).

Upon classification of a workstation, the system can report the result to a scheduler or resource manager regarding the status of the workstation, thereby enabling employees in the work area to select a workstation in a work area based on the classifications of those workstations. Additionally, the system can render (at a native application executing on a computational device), in real-time, an employee interface that can display the relative locations of workstations within a work area and an indication of each workstation's occupancy status in order to guide employees to vacant workstations within the work area. Furthermore, the system can expose additional information regarding the objects detected at a particular workstation. For example, the system can indicate that a particular workstation is reserved (i.e., occupied without a human current present) due to the presence of a laptop computer or other personal effects at the workstation. Therefore, an employee in the work area may, in the absence of any vacant workstations, identify a reserved workstation via a work area interface and request that the person occupying the reserved workstation allow the employee to use the workstation.

In one implementation, the system can also store objects that have been detected at workstations classified as occupied by the system. Therefore, the system can provide statistics and/or other guidance on what objects are frequently left occupying a workstation, thereby enabling an administrator to adjust occupancy policies and/or issue advisories regarding employees' use of workstations in the work area. Alternatively, the system can adjust an occupancy template over time to more accurately represent an occupied workstation, thereby further improving occupancy classification of the system.

In another implementation, the system can label images as occupied and/or vacant in order to prepare a training data set for an image-based classification model that is trained specifically for a particular work area. Thus, the system can serve as a temporary generalized solution that can aid in training a more permanent image-based classification model, specific to the particular work area.

Generally, the system is described herein as being executed with reference to a single workstation within a work area, however the system can execute Blocks of the method S100 multiple times for a single image in order to classify occupancy of multiple workstations within the field of view of a single sensor block. Additionally or alternatively, the system can execute Blocks of the method S100 multiple times for a single image in order to classify the activities of multiple humans present within the field of view of the sensor block. Furthermore, the system can execute Blocks of the method S100 multiple times in succession in order to aggregate individual occupancy classification or activity classifications into comprehensive space utilization data. The system can then generate use of space recommendations relevant to particular workstations within the work area based on the aggregated space utilization data.

2. System

Generally, as shown in FIG. 4, the method S100 can be executed by one or more elements (e.g., a sensor block in the set of sensor blocks and/or a remote computer system) to: record images of workstations within the work area; detect objects within those images; generate a feature vector based on the detected objects; and classify workstations as occupied or vacant. Once installed throughout the space, these sensor blocks can collect optical data, such as in the form of a color image per ten-minute interval; and a local or remote computer system can classify a workstation within the image as either occupied or vacant. The system can include one or more computational devices connected via a network (e.g., the Internet, LAN, etc.) to a local gateway. Furthermore, the local gateway is connected wirelessly to each of the sensor blocks to facilitate the receipt of images from the sensor blocks by the system.

3.1 Optical Sensor

As described in U.S. application Ser. No. 15/973,445 and as shown in FIG. 4, a sensor block can include: an optical sensor, such as a color camera; a battery; a wireless communication module configured to broadcast image data recorded by the optical sensor; and a controller; configured to selectively wake, trigger the optical sensor to record an image, write various metadata to the image, and then queue the wireless communication module to broadcast the image to the local gateway for processing. Additionally, in some implementations, the sensor block can execute the object classification model at a processor on the sensor block and transmit the feature vector generated from the image to the local gateway. The optical sensor, battery, controller, and wireless communication module, etc. can be arranged within a single housing configured to install on a flat surface, such as a wall or ceiling, with the field of view of the optical sensor facing outwardly from the flat surface.

The optical sensor defines a field of view as a function of working distance from an adjacent surface. For example, a sensor block arranged on a ceiling with the optical sensor facing downward and toward an open floor can define a field of view as a function of the ceiling height of the space at the location of the sensor block, wherein the field of view of the optical sensor increases with increased ceiling height. In this example, the controller can store various optical sensor properties, such as lens focal length and image sensor block size sets, which may define a relationship between field of view and working distance (e.g., ceiling height) of the optical sensor. The controller can also store a unique identifier (e.g., a UUID, MAC address, IP address, or other wireless address, etc.) and write this unique identifier, a timestamp, and optical sensor properties to an image or feature vector prior to passing the image or feature vector to the wireless communication module for transmission to the local gateway. Once commissioned to a space, the sensor block can wake, trigger the optical sensor to record an image, compile metadata with the image, transmit the image and metadata to a local gateway, and return to a sleep state (e.g., to limit power consumption), and repeat this process on a regular interval, such as once per ten-minute period. Multiple (e.g., dozens, hundreds) instances of the sensor block can be installed in a space and configured according to the method S100.

2.2 Local Gateway

The system can also include a local gateway: configured to receive images and/or feature vectors from sensor blocks nearby via wireless communication protocol or via a local ad hoc wireless network; to detect objects within the images by executing the object classification model (in implementations wherein this step was not completed locally at the sensor blocks); to generate a feature vector representing the objects in the images and to offload these feature vectors to inform understanding, further use, and/or maintenance, etc. of the space, such as over a computer network or long-range wireless communication protocol. The sensor blocks and/or the local gateway can transform optical images into feature vectors by implementing the object classification model to detect objects in the optical images, such as humans, chairs, desks, tables, or other objects of interest, and to pair each detected and classified object of interest with a location and orientation in the field of view of the optical sensor that recorded the corresponding image.

In an alternative implementation, the local gateway can transform optical images received from the sensor into feature-space images before transmitting the images to the system over a network. In this implementation, the sensor blocks transmit the optical images to the local gateway and the local gateway implements the aforementioned computer vision techniques.

After generating a feature vector from the optical images, the gateway can then offload the classification, and relative location (and orientation) of the object of interest to the system for classification as either occupied or vacant.

3.3 Computer System

The system further includes a remote computer system, such as a remote server, configured to receive feature vectors from one or more gateways installed in a space and to: access workstation policies and/or occupancy policies for the work area; classify the workstation corresponding to the feature vector; render a representation of the occupancy of the work station at a work area interface; and/or store the feature vectors in association with the occupancy of the workstation. Additionally, the remote computer system can train an image-based classification model for a work area based on the outputs of the occupancy classifier.

(Alternatively, various Blocks of the method S100 can be executed locally by one or more gateways also installed in the space.)

4. Commissioning, Installation, and Onboarding

The system executes the method S100 upon completion of a commissioning, installation, and onboarding process for the set of sensor blocks in a particular work area. In order to detect occupancy and vacancy of a workstation, the system relies on coverage of each workstation in the work area within the field-of-view of an optical sensor block in the set of sensor blocks. Thus, the sensor blocks may be installed across the ceiling and/or walls of a work area such that the fields-of-view of the optical sensors of the sensor blocks encompass each of the workstations of interest within the work area. Additionally, the system can guide an administrator of the work area through an onboarding interface that enables the administrator to identify workstations across the work area covered by the set of sensor blocks. In one implementation, upon installation of the set of sensor blocks over a work area, the system records an image with each of the sensor blocks and renders the set of images via a native application. An administrator can then input a set of bounding regions (e.g., bounding boxes) or image masks for each image wherein each bounding region defines a workstation within the image. Therefore, the system can receive input regarding the location of workstations relative to the field of the view of the camera. In another implementation, the system can also receive input from the administrator regarding the type of workstation corresponding to each bounding region. For example, the system, via a native application, can receive input from an administrator defining a particular work area as a conference room while defining another work area as an agile desk area. The system can then receive, via the native application, the location of each chair within the conference room or each chair and desk location within an agile work environment as workstation locations.

In one implementation, the system can automatically detect desks and chairs within the work area and automatically designate these chairs and desks as workstations within the work area, via the object detection model further described below.

5. Object Classification Model

As shown in FIG. 1, the system can: detect a set of objects in the first image based on an object classification model in Block S120; and generate a feature vector for the image based on the set of objects, the feature vector comprising a confidence value and a location of each object in the set of objects in Block S130. More specifically, the system can execute the object detection model on an image recorded at a sensor block to identify various common objects within the image. Thus, the system can obtain a set of features representing objects in the image while reducing noise introduced to the image by lighting conditions, blur, colors, or other optical and/or overtraining-related effects. In one implementation, the object detection model is a pretrained convolutional neural network, configured to detect a standard set of objects. For example, the object detection model can be trained to detect: humans, chairs, desks, computer monitors, keyboards, electronic mice, laptop computers, smartphones, computer and/or phone chargers, mugs and/or cups, purses, bags, notebooks, pens and/or pencils; or any other item that is common in the work area. In one example, the system can detect a set of objects in the image based on the object classification model, wherein the set of objects includes at least one object in a group of objects including: humans; chairs; desks; electronic displays; keyboards; electronic mice; laptop computers; smartphones; tablet computers; desktop computers; electronic chargers; electronic charging cables; whiteboards; pairs of headphones and/or earphones; mugs and/or cups; items of tableware; eating utensils; notebooks and/or paper; writing implements; bags; and articles of clothing.

In this implementation, the object detection model can be specifically trained to detect and classify objects at a similar camera angle (e.g., an overhead camera angle) and in images of a similar resolution to those images recorded by the optical sensor of the sensor block.

Upon detecting an object in an image, the object detection model can generate a bounding region in the image occupied by the object, a location of the object relative to the image (e.g., the field of view of the optical sensor), and an orientation of the object relative to the bounding region. The system can then convert these values output by the object classification model to a feature vector that identifies each object detected in the image as a feature in the feature vector. The feature vector can also include a confidence value for each object classified by the object detection model, thereby enabling the system to better weigh the influence of particular objects during execution of the occupancy classifier and/or the activity classifiers further described below.

In one implementation, the object detection model can be stored locally at each sensor block such that each sensor block can generate feature vectors locally, thereby obviating the need to wirelessly transmit images to the local gateway and/or remote computer system. Therefore, the system can reduce the battery consumption utilized in transmitting comparatively large images (when compared with a feature vector) and can circumvent privacy concerns of transmitting images of humans wirelessly within the work area.

In another implementation, the object detection model can identify a location of a chair and/or desk in the field of view of an optical sensor and define a centroid and/or boundary of the workstation based on the locations of the chair and/or desk in the image. In this implementation, the object detection model can then calculate a location for each of the other objects detected in an image relative to the centroid location of the workstation. By generating a feature vector including these relative locations, the system may provide improved classification results via the occupancy classifier.

In yet another implementation, the system can execute an object classification model that classifies objects characterized by similar visual appearances and/or similar contextual implications for occupancy and/or activities performed by humans within the work area. For example, the system can classify both bags and articles of clothing under a single category since they provide similar context for identifying occupancy of a desk within an agile desk environment. In this example, the system can train the object classification model to classify both of these types of items, when depicted in an image from a sensor block, as a single class of object. The system can classify other object classes including multiple types of objects such as a mobile device class representing smartphones and tablet computers and a small item class representing items less than a threshold size (e.g., too small to uniquely identify given the resolution of the sensor block). Thus, the system can identify an object as a member of an object class in a set of object classes including: a mobile device class representing smartphones and tablet computers; a miscellaneous clothing and bag class representing articles of clothing and bags; and a small item class representing items less than a threshold size.

In yet another implementation, the system can set a threshold confidence value characterizing objects represented within the feature vector. More specifically, the system can generate a feature vector for the first image based on the set of objects, the feature vector comprising the confidence value and the location of each object in a subset of objects from the set of objects for which the confidence value of the object exceeds a threshold confidence value. Thus, the system can exclude objects detected with low-confidence (i.e., characterized by a confidence value less than the threshold confidence value) by the object classification model in order to further reduce noise present in the feature vector.

In one example of this implementation, the system can access the threshold confidence value for the feature vector based on the time of day at which the system recorded an image at a sensor block. For example, the system can increase the threshold confidence value, thereby decreasing noise within the feature vector, during times of high-occupancy within the work area. Additionally or alternatively, the system can decrease the threshold confidence value, thereby increasing sensitivity of the feature vector, during times of low-occupancy within the work area.

In another example of this implementation, the system can access the threshold confidence value for the feature vector based on a lighting condition present in an image recorded at the sensor block. For example, the system can detect a low brightness range for the image recorded at the sensor block and, in response, decrease the threshold confidence value, thereby increasing the sensitivity of the feature vector, in order to compensate for lower confidence output by the object classification model due to the poor lighting conditions. Additionally or alternatively, the system can detect a high brightness range for the image recorded at the sensor block and, in response, increase the threshold confidence value, thereby decreasing noise within the feature vector, in order to prevent detection of spurious objects due to high contrast within the image.

In yet another implementation, the system can access a set of object classification parameters for input to the object classification model in order to improve the accuracy of the object classification model across varied work areas and workstations to which the system can be deployed. More specifically, the system can: access a set of object classification parameters including desk color, floor color, and wall color; and detect the set of objects in the image recorded by the sensor block based on the object classification model and the set of object classification parameters. Thus, the system can train the object classification model to identify objects in a variety of work areas with varying color schemes, thereby further generalizing the model and preventing overfitting of the object classification model to a particular work area. In one example, the system can train the object classification model based on a set of training images of objects, wherein the set of training images are color shifted to reflect various possible color schemes that may be present within a work area.

In yet another implementation, the system can train multiple separate object classification models such that each object classification model corresponds to a particular work area context (e.g., a conference room context or an agile desk area context). The system can, therefore, identify different objects and/or classes of objects depending on the work area context in which the sensor block is situated. For example, the system can execute a conference room object classification model to detect a set of common conference room objects such as whiteboards, whiteboard erasers, and/or electronic display monitors, upon accessing a work area context indicating that the sensor block is located within a conference room. The system can also train the conference room object classification model on furniture (e.g., chairs and tables) that are frequently located in conference rooms. Likewise, upon accessing a work area context indicating that the sensor block is located over an agile desk area, the system can execute an agile desk object classification model to detect a set of common agile desk objects such as laptop docks, coats, hats, eyeglasses, and other personal effects. In another example, the system can access a work area context that includes the geographical region in which the work area is located in order to select an object classification model that is trained to detect objects common in the geographic region based on climate or cultural patterns. Thus, the system can: access a work area context and detect the set of objects in the first image based on the object classification model and the work area context.

6. Workstation Template

As shown in FIG. 1, the system can access a workstation template for the work area, the workstation template indicating a set of default features in Block S140. Generally, the system can receive a workstation template via an input from an administrator regarding the items that are provided by default at each workstation within the work area. More specifically, the workstation template can include a list of objects that can be detected by the object detection model that are present at each workstation independent of occupancy. The system can, therefore, remove or reduce the weight of such objects when classifying occupancy of workstations in the work area. In one implementation, the system can receive multiple workstation policies, each policy corresponding to a particular type of workstation identified in the work area. Therefore, the system can receive information defining the types of objects that are present by default at each workstation in order to reduce the strength of those signals during classification of the occupancy of each workstation.

In one implementation, the system can access a set of workstation templates corresponding to the work area context of the work area. For example, the system can access a work area context of the work area indicating that the work area is a conference room and, in response, access a set of workstation templates corresponding to conference rooms. Additionally or alternatively, the system can access a work area context of the work area indicating that the work area is an agile desk area and, in response, access a set of workstation templates indicating objects present at various configurations of the agile desks within the agile desk area. Thus, the system can access a workstation template for the work area based on the work area context, the workstation template defining the set of default objects in the work area.

In another implementation, the system can, prior to classifying occupancy of a work area or activities of humans within the work area, identify the type of workstation based on the object or arrangement of objects within the workstation by attempting to match the objects or arrangement of objects within the workstation to a set of workstation templates that are applicable to the workstation. Thus, the system can identify a type of the workstation based on the first image; and access the workstation template for the work area based on the type of workstation, the workstation template defining the set of default objects in the work area.

7. Feature Pruning

Generally, upon accessing a workstation template, the system can remove features in the feature vector that correspond to objects in the set of default objects. More specifically, the system can: identify a subset of objects comprising an intersection of the set of default objects and the set of objects in Block S142; and remove the subset of objects from the feature vector in Block S144. Thus, the system removes objects from consideration by the occupancy classifier or the activity classifiers that are provided by default to workstations within the work area, thereby increasing the accuracy of these classifiers and preventing overtraining of these classifiers based on workstations in a training data set that include a particular set of default objects.

In one implementation, instead of removing the set of default objects from the feature vector completely, the system can reduce the weight of the default objects represented in the feature vector, thereby increasing the importance of other features in the feature vector. Alternatively, the system can include the set of default objects as an input to the occupancy classifier and/or the activity classifiers, thereby enabling the training processes for these classifiers to consider the set of default objects and adjust the relevant classifier accordingly. Upon executing the latter approach the system increases the probability of overtraining but, if given an appropriately diverse training data set, the system can increase accuracy when compared to previously described implementations.

8. Occupancy Template

Generally, the system can access an occupancy template for the work area, the occupancy template indicating a set of occupancy signals in Block S150. The system can receive, via a native application or other interface, an occupancy template from an administrator of the system. Alternatively, the system can generate an occupancy template for a particular work area over time upon deployment to a work area. The occupancy template defines specific objects or conditional arrangements of objects which, if detected with greater than a threshold confidence, constitute occupancy or reservation of the workstation. In one implementation, the system can then establish occupancy logic based on the policy defined by an administrator. For example, the system can access an occupancy template that designates identification of a workstation as occupied if the system detects a human at the workstation. In another example, the system can access an occupancy template that defines occupancy based on overlap between bounding regions of a human object and a chair object in the feature vector. In yet another example, the system can access an occupancy template that defines reservation of a workstation based on detecting a laptop computer within the bounding region of a desk at the workstation based on the feature vector.

Although the system can implement classification logic according to the occupancy template, this approach may fail when a human or another overt sign of occupancy is not detected at the workstation. Therefore, the system can also execute an occupancy classifier specific to the occupancy template defined by the administrator. For example, the system can execute an occupancy classifier that has been trained according to the occupancy template (via labelling of training examples as occupied, vacant, or occupied with no human present). Thus, the system can store multiple occupancy classifiers each trained to classify occupancy based on a particular occupancy template. Alternatively, the system can train a single occupancy classifier that takes in an occupancy template as input.

In one implementation, the system can access an occupancy template corresponding to the work area context of the work area in which the sensor block is located. For example, the system can access a first occupancy template corresponding to a conference room and a second occupancy template corresponding to an agile desk area. Therefore, the system can apply multiple occupancy templates corresponding to multiple work areas within a facility in order to accurately detect occupancy of workstations within each work area of a facility. Additionally, the system can access occupancy templates corresponding to other work area contexts such as the time of day at which the image was recorded, and/or the weather, and/or time of year of the region in which the work area is located. For example, in the morning, the system can access an occupancy template that includes a coffee mug in the set of significant objects, due to a high correlation of the presence of coffee mugs with occupancy in the morning. In another example, the system can access an occupancy template that includes a coat overlapping with a chair as a significant arrangement of objects due to a high correlation of the presence of coats with occupancy in regions experiencing cold weather. Thus, the system can access the occupancy template for the work area based on the work area context, the occupancy template defining the set of significant objects.

9. Activity Templates

Generally, upon detecting humans (e.g., as objects represented in the feature vector), the system can access activity templates that define objects and/or conditional arrangements of objects that are correlated with particular human activities within the work area. More specifically, the system can access an activity template for the work area, the activity template defining a set of significant objects in Block S152. Thus, the system can more accurately classify particular activities of interest occurring within the work area based on the objects and/or the arrangement of objects detected at each workstation within the work area.

The system can access an activity template defining a set of significant objects and/or a configuration of significant objects correlated with the activity of engaged working. For example, the system can access an activity template that defines overlap between a bounding region of a human at a workstation and the bounding region of a desk, a chair, and a laptop as being correlated with engaged condition of the human at the workstation. In another example, the system can access an activity template that defines overlap between a bounding region of a human at a workstation and a bounding region of a chair without overlap of the bounding region of the human and a bounding region of a laptop as correlated with a present (but not engaged) condition of the human at the workstation. In yet another example, in applications of the system in which the work area is a conference room, the system can access activity templates defining a set of significant objects or arrangements of significant object that are correlated with human activities, such as presenting, listening, and/or working (e.g., on a laptop), Thus, in addition to characterizing the occupancy rate of workstations within a work area over time, the system can also characterize human activities within the work area via activity templates and corresponding activity classifiers further described below.

10. Occupancy Classifier

Figure 3:
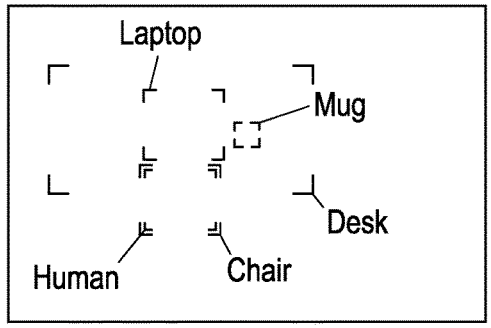
FIG. 3 is a flowchart representation of one variation of the method.
Figure 3:
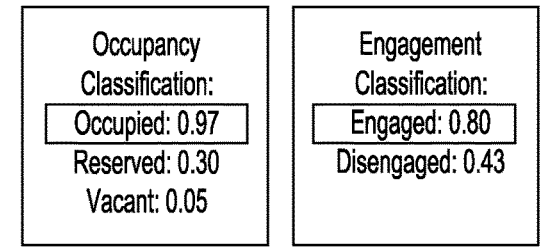

As shown in FIG. 3, the system can execute an occupancy classifier in order classify occupancy of the workstation based on the feature vector. More specifically, the system can classify the workstation as occupied, reserved, or vacant based on the feature vector and the set of significant objects accessed via the occupancy template in Block S160. A classification of "occupied" indicates that a human is present at the workstation and/or that there is a high confidence of occupancy of the workstation. A classification of "vacant" indicates that there is no human present and there are few signs or low confidence signs (if any) of occupancy at the workstation. A classification of "reserved" indicates that the workstation is likely occupied but that a human has not been explicitly detected at the workstation or that a human is likely to return to the workstation based on the objects detected at the workstation. For example, the system can classify a workstation as "reserved" if the system detects that a laptop and item of clothing are present at the workstation and that the chair corresponding to the workstation is askew but does not detect a human occupying the workstation. Thus, the system can classify the workstation as exhibiting an "occupied" condition based on the feature vector, the set of significant objects, and an occupancy classifier configured to classify the workstation according to one of a set of occupancy conditions including: a "vacant: condition; a "reserved" condition; and an "occupied" condition.

The system can, periodically (e.g., once every minute, five minutes, or ten minutes), over a time period (e.g., a week, a month, a year), classify the occupancy of the workstation within the work area. The system can then aggregate this occupancy data over the time period to calculate an occupancy rate of the workstation, which can inform use of space recommendations generated by the system. More specifically, the system can: aggregate the occupancy condition into the set of occupancy conditions for the workstation; and calculate a workstation occupancy rate based on the set of occupancy conditions.

In one implementation, the occupancy classifier can include an artificial neural network trained on a set of training examples, wherein each training example includes a feature vector generated by the object detection model and a label (provided by an administrator of the system based on an image corresponding to the feature vector). Therefore, the object classifier can be trained according to human intuition regarding the occupancy condition of the workstation. Thus, by labelling each feature vector in the set of training examples according to definitions of an administrator for occupancy, vacancy, and reservation, the occupancy classifier can classify workstations in alignment with human intuition regarding workstation occupancy.

In another implementation, the system, upon executing the occupancy classifier, generates a confidence value for each possible classification (e.g., occupied, vacant, and occupied with no human present). The system can then classify the current state of the workstation based on classification with the greatest confidence value greater than a confidence value threshold. Alternatively, upon executing the occupancy classifier, the system can generate a single confidence value that a workstation is occupied and: classify the state of the workstation as occupied when the confidence value is greater than a threshold score; classify the state of the workstation as reserved if the confidence value exceeds the threshold confidence value and no object in the feature vector is classified as a human with a greater than threshold confidence; and classify the state of the workstation as vacant if the confidence value is less than the threshold confidence value.

In yet another implementation, the system can execute an occupancy classifier that includes a rules-based classifier that classifies the state of the workstation based on the presence or absence of objects in the feature vector. For example, the rules-based classifier can: classify a workstation as occupied based on the presence of a human in the feature vector with greater than a threshold confidence value; classify a workstation as occupied without a human present if a laptop, smartphone, purse, or bag is detect with greater than a threshold confidence at the workstation; and otherwise classify the workstation as vacant.

10.1 Occupancy Threshold Selection

In one implementation, the system can dynamically select a confidence threshold for the occupancy classifier based on external signals, such as the time of day, day of the week, number of humans currently present within the work area, or any other signal accessible by the system. In one example, the system can decrease the confidence threshold for occupancy during peak working hours since the likelihood of occupancy is higher in the work area overall. Additionally or alternatively, during less busy times of day, such as outside of working hours, the system can increase the threshold for occupancy detection. In another example, the system can measure, via integration with a sign-in or security system, the number of people in a work area. In response detecting more occupied workstations than the total number of people with access to the work area the system can increase the confidence threshold for occupancy such that the number of occupied workstations equals the number of people with access to the work area.

11. Activity Classification

As shown in FIG. 3, the system can execute a set of activity classifiers (e.g., implemented as artificial neural networks or other machine learning models as described above with respect to the occupancy classifier) in order to classify activities being performed by humans present at workstations within the field of view of the sensor block. More specifically, the system can classify human activity at the workstation based on the feature vector and the set of significant objects to generate an activity classification in Block S162. The system can execute many activity classifiers in applications for which a human can be classified as performing multiple activities at the same time. Alternatively, the system can execute a single activity classifier to select a particular action for a set of mutually exclusive actions. Thus, in response to classifying a workstation as occupied (or simply identifying a human near the workstation), the system can generate richer data regarding the activity or activities performed by humans to administrators of the work area.

In one implementation, the system executes an activity classifier that classifies the engagement level of humans within the work area (e.g., whether humans are actively working or simply present within a work area) in order to provide data to administrators regarding whether the current arrangement of workstations within the work area is correlated within higher engagement of humans within the work area. More specifically, the system can classify human engagement at the workstation based on the feature vector, the set of significant objects, and an engagement classifier configured to classify an engagement level of a human occupying the workstation according to one of a set of engagement conditions including an engaged condition; a present condition; and an absent condition. The system can then aggregate multiple classified engagement conditions generated over a time period into the set of engagement conditions; and calculate a workstation engagement rate based on the set of engagement conditions. Thus, the system can calculate a workstation engagement rate that can inform use of space recommendations generated by the system.

In another implementation, the system can access the work area context of the work area in order to identify the work area as a conference room and can then execute an engagement classifier specific to conference rooms. More specifically, the system can: access a work area context of the work area, the work area context indicating the work area is a conference room; classify human engagement at the workstation based on the feature vector, the set of significant objects, and an engagement classifier configured to classify an engagement level of a human occupying the workstation according to one of a group of engagement conditions including a presenting condition, a listening condition, a working condition, and an absent condition. Upon periodically executing the engagement classifier over a time period, the system can then: aggregate the engagement conditions into the set of engagement conditions for the workstation; and calculate a workstation engagement rate based on the set of engagement conditions. Thus, the system can accurately identify whether conference rooms are being utilized as intended by administrators of the work area or whether conference rooms are instead being used as additional workspace for individuals or small groups instead of as a collaborative meeting environment.

In applications of the system to non-office-related work areas (e.g., machine shops, assembly lines, laboratories), the system can execute additional activity classifiers particular to the functions performed by humans within these setting, thereby providing work-area-specific and workstation-specific space utilization data to administrators of the work area. In each application, the system can access corresponding activity templates for input to each activity classifier along with the feature vector to generate an activity classification for an image of the work area.

In one implementation, the system can execute activity classifiers that calculate a value of a similarity measure between an activity template corresponding to the activity classifier and the set of objects represented in the feature vector. More specifically, the system can: calculate a similarity measure between the set of significant objects and the set of objects represented in the feature vector; and classify human activity at the workstation based on the similarity measure to generate an activity classification. Additionally, the system can access a threshold value of the similarity measure corresponding to detection of particular conditions or activities within the work area.

Alternatively, the system can increase accuracy of the activity classifiers while potentially increasing the risk of overfitting by including the set of significant objects defined by an activity template corresponding to the activity classifier in an input vector to the activity classifier. More specifically, the system can: generate an input vector comprising the feature vector and the set of significant objects; and classify human activity at the workstation based on the input vector and an activity classifier. Thus, the system can execute a more robust activity classifier assuming the system can access a sufficient broad training dataset.

12. Work Area User Interface

Generally, the system can render (e.g., at a native application or internet browser application) render a representation of the workstation at a work area interface, the representation indicating occupancy of the workstation. More specifically, the system can render a map or other visual representation of a set of workstations in a work area, thereby enabling an employee in the work area to select a vacant desk in the work area at which to work. In one implementation, the system can render a map indicating the location of each workstation within the work area and an indication of the most recent occupancy classification of each workstation. In one example, the system indicates each classification (including occupied, vacant, and reserved) with a different color or symbol. Additionally or alternatively, the system can indicate the amount of time that a workstation has been occupied, reserved, or vacant in order to guide employees to potentially unoccupied or abandoned workstations. Thus, the system can render the representation of the workstation at the work area, the representation of the workstation indicating the occupied condition of the workstation distinct from the vacant condition and the reserved condition.

In one implementation, the system can render, at the work area interface, a representation of objects detected at workstations in the work area in order to communicate to employees the status of the workstation beyond the occupancy classification of the workstation. For example, the system can render the position of laptops, chairs, desks, and humans relative to each workstation in the work area.

12. Occupancy Data Reporting

Generally, the system can store feature vectors in association with the occupancy classification of each classified workstation and/or the original image from which the feature vector was generated. Thus, the system can generate a summary of objects that are typically responsible for a classification of occupancy by the system. The summary can include statistics regarding the prevalence of particular objects for each classification time. For example, the system can generate a report indicating that 50% of all occupancy classifications were classified as reserved, indicating a low rate of utilization at unavailable workstations. In another example, the system can generate a report indicating that, for workstations classified as reserved, the frequency of laptops at the workstations is 65%. The system can, therefore, inform an administrator regarding these occupancy statistics, which are based on the feature vectors stored in association with an occupancy classification, so that the administrator may modify workstation policies, occupancy policies, or any other policy for a work area.

Additionally, the system can store feature vectors corresponding to a particular workstation in association with activity classifications of humans occupying the particular workstation. Thus, the system can generate a report indicating an engagement rate of humans working at a particular workstation and/or the proportion of other activities detected at the workstation. More specifically, the system can aggregate activity classifications recorded over time into a set of activity classifications in Block S180; and calculate a workstation activity statistic based on the set of activity classifications.

In one implementation in which the system executes an engagement classifier as the activity classifier, the system can: aggregate engagement conditions recorded for a workstation over time into a set of engagement conditions; and calculate an engagement rate for the workstation based on the set of engagement conditions. For example, the system can calculate that occupants of a particular workstation are only classified as exhibiting an engaged condition 40% of the time they are occupying the workstation. Thus, by providing these engagement statistics to an administrator of the system, the system enables administrators to make more informed decisions regarding the placement and organization of workspaces within a work area.

In another implementation in which the system executes an occupancy classifier, the system can: aggregate occupancy conditions of the workstation over a time period into a set of occupancy conditions; and calculate a workstation utilization rate for the workstation based on the set of occupancy conditions.

14. Use of Space Recommendations

Generally, the system can automatically generate a use of space recommendation for workspaces and/or work areas in order to improve utilization of a work area in Block S190. Thus, the system can recommend specific steps to administrators of a work area based on occupancy rates, engagement rates, and/or other rates of other activities classified within the work area.

In one implementation, the system can receive, from an administrator of the system, a set of target utilization rates, engagement rates, and/or other rates of activities classified within the work area. The system can then automatically: detect when workstations and/or entire work areas do not meet the target rates over a predetermined time period (e.g., a week, a month, a year). The system can then generate specific recommendations associated with the workstation or work area to the user, in response to detecting that the target rate has not been met.

In one example, the system can, in response to a target workstation utilization rate exceeding the workstation utilization rate, generate a recommendation to reduce a number of workstations within the work area. In another example, the system can, in response to a target workstation engagement rate exceeding the workstation engagement rate, generate a recommendation to reduce distractions within the work area. In yet another example, the system can, in response to a target workstation occupancy rate of a conference room exceeding a workstation occupancy rate of the conference room, generate a recommendation to reduce a size of the conference room.

15. Image-Based Classifier

In one implementation, the system can label images as occupied, occupied with no human present, and/or vacant, based on the object detection model and the occupancy classifier as described above. The system can then store the classification of each image in association with the original image from which this classification was generated as a training example for an image-based classifier specific to the work area. The system can then train an image-based classifier in order to directly classify an image regarding the occupancy of a workstation in the image without an intermediate object detection step.

In one implementation, the system can define a confidence threshold for inclusion of a classification and an associated image as a training example. For example, the system can include only images for which the occupancy classifier indicates a classification with greater than 90% confidence.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:
    recording a first image at a sensor block at a first time, the sensor block defining a field of view intersecting a work area and encompassing a workstation in the work area;
    detecting a set of objects in the first image based on an object classification model;
    generating a feature vector for the first image based on the set of objects, the feature vector comprising a confidence value and a location of each object in the set of objects;
    accessing a workstation template for the work area, the workstation template defining a set of default objects for each workstation in the work area;
    identifying a first subset of objects comprising an intersection of the set of default objects and the set of objects;
    removing the first subset of objects from the feature vector;
    accessing an occupancy template for the work area, the occupancy template defining a set of significant objects;
    accessing an occupancy classifier configured to classify human occupancy at the workstation according to an occupancy condition selected from a set of occupancy conditions comprising:
        a vacant condition;
        a reserved condition; and
        an occupied condition;
    classifying human occupancy at the workstation based on the feature vector, the set of significant objects, and the occupancy classifier;
    storing the occupancy condition in a set of occupancy conditions derived for the workstation;
    calculating a workstation utilization rate based on the set of occupancy conditions;
    in response to a target workstation utilization rate exceeding the workstation utilization rate, generating a recommendation to reduce a number of workstations within the work area; and
    rendering a representation of the workstation at a work area interface, the representation indicating the occupied condition of the workstation.

2. The method of claim 1, wherein detecting the set of objects in the first image based on the object classification model comprises detecting the set of objects in the first image based on the object classification model, the set of objects comprising at least one object in a group of objects comprising:
    a human;
    a chair;
    a desk;
    an electronic display;
    a keyboard;
    an electronic mouse;
    a laptop computer;
    a smartphone;
    a tablet computer;
    a desktop computer;
    an electronic charger;
    an electronic charging cable;
    a whiteboard;
    a pair of headphones;
    a pair of earphones;
    a mug;
    a cup;
    an item of tableware;
    an eating utensil;
    a notebook;
    a writing implement;
    a bag; and
    an article of clothing.

3. The method of claim 1, wherein detecting the set of objects in the first image based on the object classification model comprises identifying an object class in a set of object classes of each object in the set of objects, the set of object classes comprising:
- a mobile device class representing smartphones and tablet computers;
- a miscellaneous class representing articles of clothing and bags; and
- a small item class representing items less than a threshold size.

4. The method of claim 1:
further comprising accessing a set of object classification parameters comprising:
- a first object classification parameter representing desk color;
- a second object classification parameter representing floor color; and
- a third object classification parameter representing wall color; and
wherein detecting the set of objects in the first image based on the object classification model comprises detecting the set of objects in the first image based on the object classification model and the set of object classification parameters.

5. The method of claim 1:
further comprising accessing a work area context; and
wherein detecting the set of objects in the first image based on the object classification model comprises detecting the set of objects in the first image based on the object classification model and the work area context.

6. The method of claim 5:
wherein accessing the work area context comprises accessing the work area context comprising a desk area context;
wherein accessing the workstation template for the work area comprises accessing the workstation template for the work area based on the desk area context, the workstation template defining the set of default objects in the work area; and
wherein accessing the occupancy template for the work area comprises accessing the occupancy template for the work area based on the desk area context, the occupancy template defining the set of significant objects.

7. The method of claim 1:
further comprising identifying a type of the workstation based on the first image; and
wherein accessing the workstation template for the work area comprises accessing the workstation template for the work area based on the type of workstation, the workstation template defining the set of default objects in the work area.

8. The method of claim 1:
further comprising, setting a threshold confidence value characterizing a second subset of objects in the set of objects; and
wherein generating the feature vector for the first image based on the set of objects comprises generating the feature vector for the first image based on the second subset of objects in the set of objects, the feature vector comprising:
- the confidence value of each object in the second subset of objects exceeding the threshold confidence value; and
- the location of each object in the second subset of objects.

9. The method of claim 8, wherein setting the threshold confidence value characterizing the second subset of objects in the set of objects comprises:
- accessing the threshold confidence value based on a time of day of the first time; and
- in response to the time of day of the first time corresponding to low-occupancy within the work area, decreasing the threshold confidence value.

10. The method of claim 8, wherein setting the threshold confidence value characterizing the second subset of objects in the set of objects comprises:
- accessing the threshold confidence value based on a lighting condition of the first image; and
- in response to the lighting condition of the first image falling below a threshold lighting condition, decreasing the threshold confidence value.

11. The method of claim 1:
wherein rendering the representation of the workstation at the work area interface comprises rendering the representation of the workstation at the work area, the representation of the workstation indicating the occupied condition of the workstation distinct from the vacant condition and the reserved condition.

12. The method of claim 1:
further comprising assigning a weight to the first subset of objects intersecting the set of objects and the set of default objects represented in the feature vector; and
wherein removing the first subset of objects from the feature vector comprises decreasing the weight of the first subset of objects represented in the feature vector.

13. A method comprising:
- during a first sampling period, recording an image at a sensor block, the sensor block defining a field of view intersecting a work area and encompassing a workstation in the work area;
- detecting a set of objects in the image based on an object classification model;
- generating a feature vector for the image based on the set of objects, the feature vector comprising a classification and a location of each object in the set of objects;
- accessing a workstation template for the work area, the workstation template defining a set of default objects in the work area;
- identifying a subset of objects comprising an intersection of the set of default objects and the set of objects;
- removing the subset of objects from the feature vector;
- accessing an activity template for the work area, the activity template defining a set of significant objects;
- accessing an engagement classifier configured to classify an engagement level of a human occupying the workstation according to an engagement condition selected from a set of engagement conditions comprising:
  - an engaged condition;
  - a present condition; and
  - an absent condition;
- classifying human engagement at the workstation based on the feature vector, the set of significant objects, and the engagement classifier;
- storing the engagement condition in a set of engagement conditions derived for the workstation over the first sampling period in a sequence of sampling periods;
- calculating a workstation engagement rate based on the set of engagement conditions; and
- in response to a target workstation engagement rate exceeding the workstation engagement rate, generating a recommendation to reduce distractions within the work area.

14. A method comprising:
during a first sampling period, recording a first image at a sensor block, the sensor block defining a field of view intersecting a work area and encompassing a workstation in the work area;
accessing a work area context of the work area, the work area context indicating the work area is a conference room;
detecting a set of objects in the first image based on an object classification model;
generating a feature vector for the first image based on the set of objects, the feature vector comprising a confidence value and a location of each object in the set of objects;
accessing a workstation template for the work area, the workstation template defining a set of default objects for each workstation in the work area;
identifying a subset of objects comprising an intersection of the set of default objects and the set of objects;
removing the subset of objects from the feature vector;
accessing an activity template for the work area, the activity template defining a set of significant objects;
accessing an engagement classifier configured to classify an engagement level of the workstation according to an engagement condition selected from a set of engagement conditions comprising:
a presenting condition;
a listening condition;
a working condition; and
an absent condition;
classifying human engagement at the workstation based on the feature vector, the set of significant objects, and the engagement classifier;
storing the engagement condition in a set of engagement conditions derived for the workstation over the first sampling period in a sequence of sampling periods;
calculating a workstation engagement rate based on the set of engagement conditions; and
in response to a target workstation engagement rate exceeding the workstation engagement rate, generating a recommendation to reallocate the conference room to general desk space.

15. A method comprising:
during a first sampling period, recording a first image at a sensor block at a first time, the sensor block defining a field of view intersecting a work area and encompassing a workstation in the work area;
accessing a work area context of the work area, the work area context indicating the work area is a conference room;
detecting a set of objects in the first image based on an object classification model;
generating a feature vector for the first image based on the set of objects, the feature vector comprising a confidence value and a location of each object in the set of objects;
accessing a workstation template for the work area, the workstation template defining a set of default objects for each workstation in the work area;
identifying a subset of objects comprising an intersection of the set of default objects and the set of objects;
removing the subset of objects from the feature vector;
accessing an activity template for the work area, the activity template defining a set of significant objects;
accessing an occupancy classifier configured to classify human occupancy at the workstation according to an occupancy condition selected from a set of occupancy conditions comprising:
a vacant condition;
a reserved condition; and
an occupied condition;
classifying human occupancy at the workstation based on the feature vector, the set of significant objects, and the occupancy classifier;
storing the occupancy condition in a set of occupancy conditions derived for the workstation over the first sampling period in a sequence of sampling periods;
calculating a workstation occupancy rate based on the set of occupancy conditions; and
in response to a target workstation utilization rate exceeding the workstation utilization rate, generating a recommendation to reduce a size of the conference room.

16. The method of claim 15, wherein classifying human occupancy at the workstation comprises:
calculating a similarity measure between the set of significant objects and the set of objects represented in the feature vector; and
classifying the workstation as exhibiting the occupied condition based on the similarity measure and the occupancy classifier.

17. The method of claim 15, wherein classifying human occupancy at the workstation comprises:
generating an input vector comprising the feature vector and the set of significant objects; and
classifying the workstation as exhibiting the occupied condition based on the input vector and the occupancy classifier.

* * * * *